United States Patent [19]
Pitner

[11] 3,813,136
[45] May 28, 1974

[54] RADIAL NEEDLE BEARING ASSEMBLY
[75] Inventor: Alfred Pitner, Paris, France
[73] Assignee: Nadella, Malmaison, France; a part interest
[22] Filed: Aug. 11, 1972
[21] Appl. No.: 280,065

[30] Foreign Application Priority Data
Sept. 1, 1971 France .................. 71.31582

[52] U.S. Cl. ............................................ 308/213
[51] Int. Cl. ........................................ F16c 33/00
[58] Field of Search .......... 308/207, 213, 214, 212, 308/206, 208, 210

[56] References Cited
UNITED STATES PATENTS
3,589,143   6/1971   Batt .................................. 308/212
FOREIGN PATENTS OR APPLICATIONS
1,937,509   9/1970   Germany ........................... 308/213

Primary Examiner—Charles J. Myhre
Assistant Examiner—Frank Susko
Attorney, Agent, or Firm—Robert E. Burns; Emmanuel J. Labato

[57] ABSTRACT

An assembly comprising a radial needle bearing having a cold-formed sheet metal outer bearing ring including a radial flange for axially retaining the bearing needles and an annular member which is integral with said radial flange and extends radially outwardly and covers and shields said radial flange.

One portion of the annular member may be arranged to bear against a surface of a support which defines a bore in which said bearing is fitted so that the annular member also axially retains said bearing in said bore.

15 Claims, 6 Drawing Figures

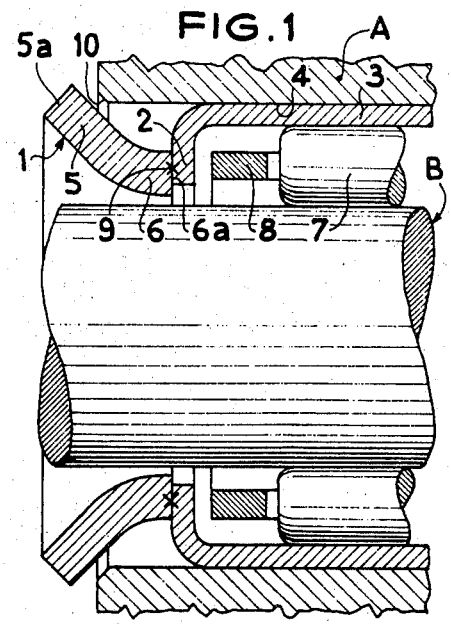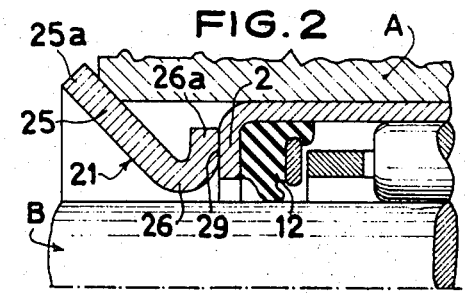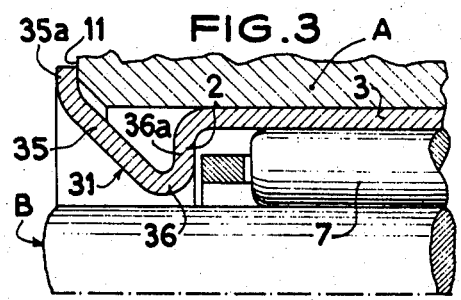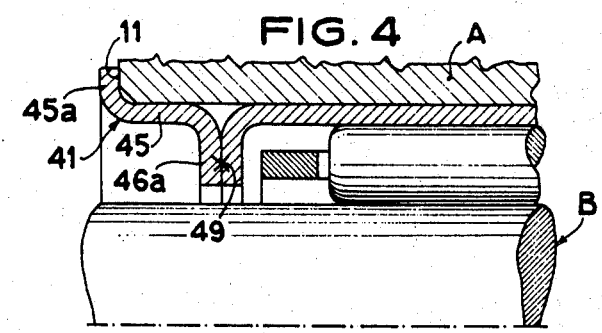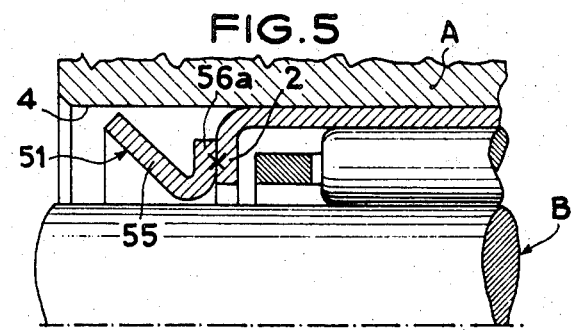

RADIAL NEEDLE BEARING ASSEMBLY

The present invention relates to a needle bearing assembly comprising a cold-formed sheet metal outer ring which is provided with at least one radial flange for axially retaining the needles and is fitted in a bore of a support.

The operation for placing in position in such an assembly the part carrying the inner raceway, which may form part of a relatively heavy and cumbersome unit, is often carried out —in particular when it concerns a massproduction assembly — by unskilled labour within a prescribed short period of time. Owing to faulty handling, an axial shock may result from an imperfect relative positioning of the parts to be assembled and may have adverse effects and, in particular the following :

axial displacement of the outer ring of the bearing in its bore notwithstanding the clamping due to the fit ;

local deformations of the ring, composed of relatively thin sheet steel, by the part which carries the inner raceway and has a high surface hardness.

damage to the needles and possibly to the cage and the sealing means incorporated in the outer bearing ring.

In mass-production industries, such as the automobile industry and agricultural machinery industry, special precautions have had to be taken in an effort to avoid these drawbacks. Thus there have been employed guide means of different forms fitted in the bore of the support in front of the outer bearing ring. These guide means which have, owing to lack of space or in order to avoid overhanging or bending a short length of fit, lack strength and become deformed under the effect of shocks and in bearing against the bearing ring they damage it, or, above all, they lose their position in the bore. They can no longer perform their guiding and protecting function and, moreover, there is a danger that they become lost in the mechanical structure where they may cause damage.

An object of the present invention is to provide an efficient remedy which is sure in operation and cheap.

The invention provides an assembly wherein there is provided an annular member which is integral with the radial flange of the ring and extends radially outwardly so as to cover at least said radial flange.

Whether this annular member be a separate member welded to the radial flange or in one piece therewith, its position with respect to the bearing ring cannot vary so that it performs its guiding and protecting function irrespective of the conditions under which the part carrying the inner raceway of the bearing is placed in position.

It is advantageous to arrange that the annular member be a collar extending axially from the side of the flange opposed to the needles in the annular space between the bore and an imaginary cylinder which is inside the circular arrangement of the needles and tangent to the needles.

In order to ensure a correct guiding, the collar advantageously has a tapering shape, for example a conical shape.

When the collar is an attached member it is rational to arrange that the connection with the ring be achieved before the heat treatment of the latter and that the collar cooperate with the radial flange of the ring in such manner as to mask the region in which the spot welds are provided so as to restrict the supply of carbon in the course of the hardening treatment and thereby avoid rendering the spot welds brittle. The collar then has an improved resistance to shocks.

In order to improve the welding operation, the collar constructed as an independent member, may be provided with folds or bosses.

In order to improve the performance of the collar under the effect of shocks, the end of the collar opposed to the radial flange of the ring is advantageously brought to bear against a support surface so as to be retained axially in the bore.

Further features and advantages of the invention will be apparent from the ensuing description with reference to the accompanying drawings.

In the drawings :

FIGS. 1 to 4 are axial sectional views of different embodiments of a radial needle bearing assembly provided with a protective collar which bears against a support;

FIG. 5 is an axial sectional view of an embodiment in which the whole of the collar is within the bore of the support, and, FIG. 6 is a modification of the embodiment shown in FIG. 2 showing how a shaft is placed inside the bearing.

Figure 6:
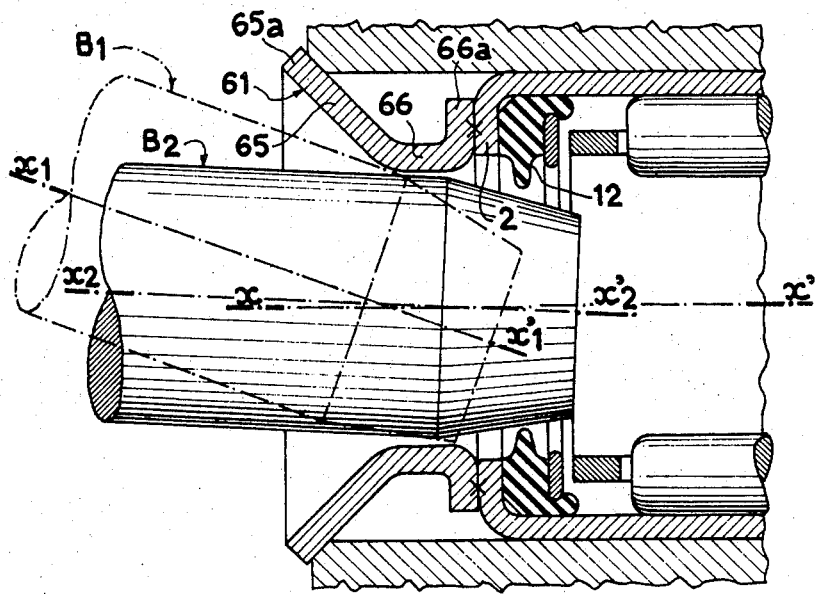

FIG. 1 shows a steel tube or collar 1 which is fixed to the radial flange 2 of the outer ring 3 of a radial needle bearing whose needles 7 are contained in a cage 8. The outer ring 3 is fitted in a bore 4 of a support A. The tube 1 has a frustoconical main portion 5 which is connected at its smaller end to a ring-shaped portion 6. The end surface 6a of the tube bears against, and is welded to, the radial flange 2 at 9. The opposite end 5a of the tube extends both axially and radially beyond the bore 4 so that the lateral surface of the convergent portion 5 can bear against the chamfered surface 10 of the support A so as to maintain the tube 1 in axial position when the tube is subjected to the shocks or blows that the ring 3 would otherwise receive when the shaft B is placed inside the bearing. For this purpose, the tube has a thickness exceeding that of the ring which is composed in the conventional manner of a cold-formed thin sheet metal and it has the same surface hardness as the ring, this being the result of a common heat treatment carried out after the welding 9.

In the embodiment shown in FIG. 2, the tube or collar 21 has at the smaller end of its portion 25 a fold 26 which defines a radial flange 26a which is applied against, and welded to, the radial flange 2 of the ring 3 at 29. Sealing means 12 for the needles 7, for example constructed in accordance with the teaching of the French Certificate of Addition No. 95,325. are provided inside the ring 3.

In the embodiment shown in FIG. 3, the tube or collar 31 is in one piece with the ring 3 whose radial flange 2 coincides with the flange 36a of the tube. Further, the larger end of the tube has a second radial flange 35a which bears against the plane surface II of the support A.

The tube or collar 41 shown in FIG. 4 has a main portion 45 which is cylindrical instead of being conical and has at both ends two radial flanges 46a, 45a, the flange 46a being welded to the radial flange 2 at 49 and the flange 45a bearing against the surface II of the support A so that the tube has a Z-shaped cross-section.

FIG. 5 shows a tube or collar 51 which has the same shape as that shown in FIG. 2. It is disposed entirely within the bore 4, the flange 56a being welded to the flange 2.

FIG. 6 shows the shaft B at the moment when it is engaged in the bearing. The dot-dash line $B_1$ and the full line $B_2$ show two successive positions of the shaft whose axis moves from $x_1, x'_1$, to $x_2, x'_2$ as it approaches the axis $x, x'$ of the bearing. The tube or collar 61 has between the tapered portion 65 and the flange 66a which is welded to the flange 2, an intermediate portion 66 which, when the shaft is being placed in position, restricts the angle made between the axis of the shaft and the axis of the bearing. It will be observed that the lip of the sealing means 12 does not come in contact with the end of the shaft.

Whenever the tube has a flange welded to the radial flange of the ring it is possible, in order to facilitate the welding operation, to provide bosses on this flange of the tube which come in contact with the adjacent flange 2. These bosses may be constituted by portions in relief resulting from the forming of radial grooves on the surface of the flange opposed to the flange 2. These grooves furthermore increase the stiffness of the flange of the tube.

In FIGS. 2, 4, 5 and 6, the radial flange 26a, 46a, 56a, 66a of the tube or collar and the adjacent radial flange 2 of the ring are in contact with each other on both sides of the spot welds so as to restrict the supply of carbon in the course of the heat treatment for hardening to the spot welds and the region surrounding the latter. In this way it is possible to limit the carbon content of this region and the welds cannot be hardened in depth so that the spot welds do not become brittle.

Note that the conical shape of the tube shown in FIGS. 1, 2, 5 and 6 renders the tube flexible so that when the ring is fitted into the bore 4 of the support, the spot welds are not subjected to excessive stresses.

Having now described my invention what I claim as new and desire to secure by letters patent is :

1. An assembly comprising a radial needle bearing having needles, a cold-formed sheet metal outer bearing ring having a cylindrical outer surface and a radial flange which defines an inner peripheral edge porition and axially retains the needles and means for protecting said bearing against shocks when axially inserting in said bearing a member defining an inner raceway for said needles, said means consisting of a collar located entirely on the outside of said ring and having an outer peripheral edge portion and an inner peripheral edge portion which is substantially adjacent said inner peripheral edge portion of said flange, said collar being integral with said flange and said outer peripheral edge portion being radially outwardly offset from and axially offset from said inner peripheral edge portion of said collar and located radially outwardly beyond an imaginary cylindrical surface axially extending said cylindrical outer surface.

2. An assembly comprising a support, means defining a bore in said support, a radial needle bearing having a circular arrangement of needles and a cold-formed sheet metal outer bearing ring having a radial flange which axially retains said needles, said ring being an interference fit in said bore, and means for protecting said bearing against shocks when axially inserting in said bearing a member defining an inner raceway for said needles, said means consisting of a collar located entirely on the outside of said ring and having an outer peripheral edge portion and an inner peripheral edge portion which is substantially adjacent said inner peripheral edge portion of said flange, said collar being integral with said flange and said outer peripheral edge portion being radially outwardly offset from and axially offset from said inner peripheral edge portion of said collar, said collar extending radially across substantially the whole of an annular space defined radially outwardly by said bore and radially inwardly by an imaginary cylindrical surface coaxial with said bore and located partly inside said circular arrangement of needles and tangent to said needles.

3. An assembly comprising a support, means defining a bore in said support, a radial needle bearing having a circular arrangement of needles and a cold-formed sheet metal outer bearing ring having a radial flange which axially retains said needles, said ring being an interference fit in said bore, and means for protecting said bearing against shocks when axially inserting in said bearing a member defining an inner raceway for said needles, said means consisting of a collar located entirely on the outside of said ring and having an outer peripheral edge portion and an inner peripheral edge portion which is substantially adjacent said inner peripheral edge portion of said flange, said collar being integral with said flange and said outer peripheral edge portion being radially outwardly offset from and axially offset from said inner peripheral edge portion of said collar, said collar extending radially across substantially the whole of an annular space defined radially outwardly by said bore and radially inwardly by an imaginary cylindrical surface coaxial with said bore and located partly inside said circular arrangement of needles and tangent of said needles, said support having a surface and said outer peripheral edge portion being located radially beyond said bore and being in axially supported relation to said surface of said support whereby said collar precludes axial displacement of said bearing in said bore.

4. An assembly as claimed in claim 3, wherein said outer peripheral edge portion which is supported against said surface of said support defines a radial flange.

5. An assembly as claimed in claim 2, wherein said collar has a portion of convergent shape which is convergent toward said inner peripheral edge portion of said collar.

6. An assembly as claimed in claim 5, wherein said convergent portion is frustoconical.

7. An assembly as claimed in claim 4, wherein said collar has a cylindrical portion between said radial flange of the collar and said inner peripheral edge portion of said collar.

8. An assembly comprising a radial needle bearing having needles, a cold-formed sheet metal outer bearing ring having a radial flange which defines an inner peripheral edge prtion and axially retains the needles and means for protecting said bearing against shocks when axially inserting in said bearing a member defining an inner raceway for said needles, said means consisting of a collar distinct from said ring and located entirely on the outside of said ring and having an outer peripheral edge portion and an inner peripheral edge portion which is substantially adjacent said inner peripheral edge portion of said flange, and means on the outside of said bearing for fixing said collar to said flange, and said outer peripheral edge portion being radially outwardly offset from and axially offset from said inner peripheral edge portion of said collar.

9. An assembly comprising a support, means defining a bore in said support, a radial needle bearing having a circular arrangement of needles and a cold-formed sheet metal outer bearing ring having a radial flange which axially retains said needles, said ring being an interference fit in said bore, and a collar which has a radial flange welded to said radial flange of said ring and extends radially outwardly and shields said radial flange of said ring in said bore and extends axially from the side of said flange of said ring opposed to said needles in an annular space defined radially outwardly by said bore and radially inwardly by an imaginary cylindrical surface coaxial with said bore and located inside said circular arrangement of needles and tangent to said needles.

10. An assembly comprising a radial needle bearing having needles, a cold-formed sheet metal outer bearing ring having a radial flange which axially retains the needles and an annular member which is welded to the radial flange of the ring and extends radially outwardly and covers said radial flange, said annular member being welded to said flange by spot welds and said annular member and said flange being in contacting relation to each other radially on each side of said spot welds so as to limit the supply of carbon, when heat treating the ring to harden the ring, to said spot welds and to a region of said annular member surrounding said spot welds and therby avoid rendering said spot welds brittle.

11. An assembly as claimed in claim 2, wherein said collar and said ring are integral portions of a single member.

12. An assembly as claimed in claim 5, wherein said collar has a cylindrical portion between said convergent portion and said radial flange of said ring.

13. An assembly as claimed in claim 8, wherein said means for fixing said collar to said flange is a weld and said collar is flexible relative to said ring so as to avoid any excessive stress in said weld when said ring is fitted into said bore.

14. An assembly comprising a support, means defining a bore in said support, a radial needle bearing having a circular arrangement of needles and a cold-formed sheet metal outer bearing ring having a radial flange which axially retains said needles, said ring being an interference fit in said bore, and means for protecting said bearing against shocks when axially inserting in said bearing a member defining an inner raceway for said needles, said means consisting of a collar located entirely on the outside of said ring and having on outer peripheral edge portion and an inner peripheral edge portion which is substantially adjacent said inner peripheral edge portion of said flange, said collar being integral with said flange and said outer peripheral edge portion being radially outwardly offset from said inner peripheral edge portion of said collar, said collar extending radially across substantially the whole of an annular space defined radially outwardly by said bore and radially inwardly by an imaginary cylindrical surface coaxial with said bore and located partly inside said circular arrangement of needles and tangent to said needles, said support having a surface and said outer peripheral edge portion being located radially beyond said bore and being in axially supported relation to said surface of said support whereby said collar precludes axial displacement of said bearing in said bore.

15. An assembly comprising a radial needle bearing having needles, a cold-formed sheet metal outer bearing ring having a radial flange which has an outer surface remote from said needles and defines an inner peripheral edge portion and axially retains the needles, and means for protecting said bearing against shocks when axially inserting in said bearing a member defining an inner raceway for said needles, said means consisting of a collar distinct from said ring and located entirely on the outside of said ring and having an outer peripheral edge portion and an inner peripheral edge portion which is located radially inwardly of said outer peripheral edge portion and substantially adjacent said inner peripheral edge portion of said flange, and means on the outside of said bearing for fixing said collar to said outer surface of said flange.

* * * * *